T. HARDING.
Mowing Machine.
No. 17,350.
Patented May 19, 1857.
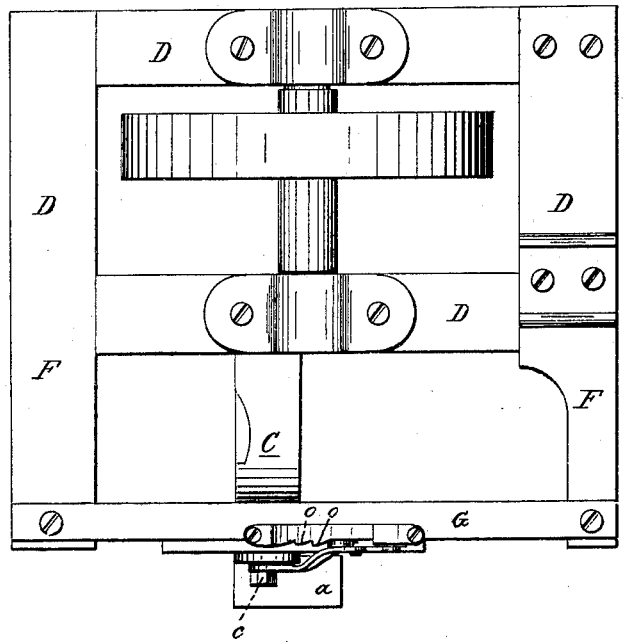
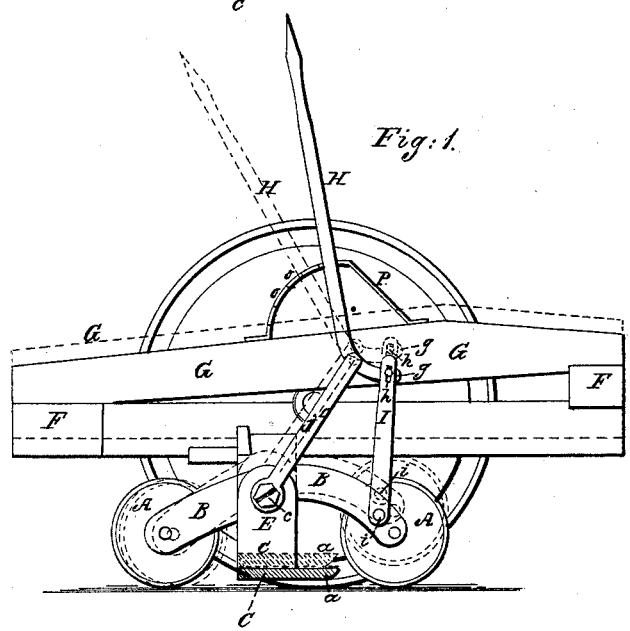

UNITED STATES PATENT OFFICE.

THOMAS HARDING, OF SPRINGFIELD, OHIO, ASSIGNOR TO WARDER, BROKAW & CHILD.

IMPROVEMENT IN MOWING-MACHINES.

Specification forming part of Letters Patent No. 17,350, dated May 19, 1857.

*To all whom it may concern:*

Be it known that I, THOMAS HARDING, of Springfield, in the county of Clarke and State of Ohio, have invented a new and Improved Truck for Mowing-Machines, of which the following is a full, clear, and exact description, reference being had to the accompanying drawings of the same, in which—

Figure 1 represents a transverse vertical section of a mowing-machine embracing my improvement, taken through the finger-bar and looking toward the driving-wheel; and Fig. 2, a plan of the same.

My improvement consists in the arrangement and combination of a truck of a peculiar construction with the Ketchum mowing-machine for the purpose of lightening the draft and enabling the machine to back and turn with ease.

To enable others skilled in the art to make, construct, and use my invention, I will now proceed to describe it in detail, omitting a description of such parts of a mowing-machine as are unessential to a full understanding of the improvement.

Two wheels, A A, connected by a yoke, B, are so arranged as to run one in front and the other in rear of the finger-bar C, immediately at the foot of the arch, and on the side of the shoe $a$ next the main frame D. At this point a bracket, E, is erected, to which the yoke B is pivoted so as to turn freely by means of a bolt, $c$, passing through it and a hole near the center of the yoke B into the arch of the finger-bar. This yoke is so set or bent that the bottom of the two wheels shall project below the under surface of the shoe $a$ of the finger-bar, thus relieving it in running from all friction.

To the inner end of the cross-beams F F of the main frame D is bolted a beam, G, to which is pivoted a crooked lever, H, by means of a bolt, $e$, passing through it into the side of the beam G, and which acts as the fulcrum of the lever. To the short or curved end of the lever H is attached the upper end of a connecting-rod, I, by means of a bolt, $g$, passing through a slot, $h$, formed in its upper end, and secured to the end of the lever H, its lower end being pivoted to a stud, $i$, secured to the front end of the yoke B. The slot in the end of the connecting-rod enables the machine, through the wheels A A, to override any obstruction and to run freely over uneven ground.

When it is desired to back or turn the machine the driver draws back the lever H, which, turning on its fulcrum, raises the forward end of the yoke and front wheel off the ground, and depresses the rear end and wheel, thus raising the foot of the arch and the finger-bar attached thereto completely off the ground, and supporting the whole weight of the machine upon it, which renders it easy to be backed or turned, or to run freely from field to field, as required, there being a series of notches, $o$, cut in a bracket, P, secured to the upper side of the beam G, for the reception of the lever H, by means of which the cutter-bar can be held at any required height for the above-mentioned purposes.

M represents a brace connecting the finger-bar and the beam, it being secured upon the pivot $c$ of the yoke B and the fulcrum $e$ of the lever H.

It will be seen by reference to the arrangement of my truck that in case of backing the machine, should the rear truck-wheel come in contact with an obstruction that it cannot surmount the driver can, by merely pushing forward the lever H, bring the front truck-wheel down and raise the rear one up, so as to clear the obstruction, and vice versa. In this respect it is a matter of importance, as it enables the driver under any circumstances to clear the obstruction without for a moment withdrawing his attention from the horses. I may here state that I am aware that the inner end of the finger-bar of mowing-machines has been supported by a truck-wheel in front and rear. I am also aware that a single truck-wheel has been used for raising and lowering the finger-bar. These devices therefore form no part of my present claim.

Having thus described my invention, what I claim as new, and desire to secure by Letters Patent, is—

The combination, with a mowing-machine, of the peculiarly-constructed truck A B, when both are arranged to operate in relation to each other in the manner and for the purposes set forth.

In testimony whereof I have hereunto set my hand this 6th day of April, A. D. 1857.

THOMAS HARDING.

Witnesses:
ROSS MITCHELL,
GIDEON SMITH.